(12) United States Patent
Chen et al.

(10) Patent No.: US 10,435,529 B2
(45) Date of Patent: Oct. 8, 2019

(54) AIR-PERMEABLE SPONGE COMPOSITION AND METHOD FOR PREPARING AIR-PERMEABLE SPONGE BY USING THE SAME

(71) Applicant: XILINMEN FURNITURE CO., LTD., Zhejiang (CN)

(72) Inventors: Ayu Chen, Zhejiang (CN); Bin Chen, Zhejiang (CN); Shaojing Guo, Zhejiang (CN); Suyu Guo, Zhejiang (CN); Xinhui Bi, Zhejiang (CN); Lei Guo, Zhejiang (CN)

(73) Assignee: Xilinmen Furniture Co., Ltd., Zhejiang (CN)

( * ) Notice: Subject to any disclaimer, the term of this patent is extended or adjusted under 35 U.S.C. 154(b) by 234 days.

(21) Appl. No.: 15/688,085

(22) Filed: Aug. 28, 2017

(65) Prior Publication Data

US 2019/0010300 A1 Jan. 10, 2019

(30) Foreign Application Priority Data

Jul. 4, 2017 (CN) .......................... 2017 1 0535408

(51) Int. Cl.
*C08J 9/00* (2006.01)
*C08J 9/36* (2006.01)
(Continued)

(52) U.S. Cl.
CPC ............... *C08J 9/0061* (2013.01); *B32B 5/18* (2013.01); *B32B 27/065* (2013.01); *C08G 18/165* (2013.01); *C08G 18/244* (2013.01); *C08G 18/3206* (2013.01); *C08G 18/4072* (2013.01); *C08G 18/4837* (2013.01); *C08G 18/632* (2013.01); *C08G 18/6674* (2013.01); *C08G 18/6677* (2013.01); *C08G 18/755* (2013.01); *C08G 18/7621* (2013.01); *C08G 18/7671* (2013.01); *C08J 9/0009* (2013.01); *C08J 9/365* (2013.01); *C09D 175/08* (2013.01);
(Continued)

(58) Field of Classification Search
CPC ..... B32B 5/18; B32B 5/20; B32B 5/32; C08J 9/0009; C08J 9/365; C08J 9/0061
See application file for complete search history.

(56) References Cited

U.S. PATENT DOCUMENTS

2013/0296449 A1* 11/2013 Peterson ................ C08J 9/0009
521/122
2016/0280838 A1* 9/2016 Lambert ................ C08J 9/0061

FOREIGN PATENT DOCUMENTS

CN 103660407 A 3/2014

* cited by examiner

*Primary Examiner* — Alex A Rolland
(74) *Attorney, Agent, or Firm* — Muncy, Geissler, Olds & Lowe, P.C.

(57) ABSTRACT

An air-permeable sponge composition and a method for preparing an air-permeable sponge by using the same belong to the field of articles for daily use. An air-permeable sponge composition includes a sponge body and an air-permeable coating, and an outer surface layer of the sponge body being coated with the air-permeable coating. A method for making the air-permeable sponge utilizes the composition of the air-permeable sponge, wherein the air-permeable sponge is made from the air-permeable sponge composition under specific process parameters. The sponge body and air-permeable coating have the same or similar contents of isocyanate, polyether polyol and polymeric polyol and a similar porous structure.

17 Claims, 2 Drawing Sheets

(51) Int. Cl.
    *B32B 5/18*     (2006.01)
    *B32B 27/06*     (2006.01)
    *C08G 18/48*     (2006.01)
    *C08G 18/63*     (2006.01)
    *C08G 18/66*     (2006.01)
    *C08G 18/75*     (2006.01)
    *C08G 18/76*     (2006.01)
    *C08G 18/16*     (2006.01)
    *C08G 18/24*     (2006.01)
    *C09D 175/08*     (2006.01)
    *C08G 18/32*     (2006.01)
    *C08G 18/40*     (2006.01)
    *C08G 101/00*     (2006.01)

(52) U.S. Cl.
    CPC ..... *C08G 2101/0083* (2013.01); *C08J 9/0028* (2013.01); *C08J 9/0042* (2013.01); *C08J 2201/026* (2013.01); *C08J 2205/05* (2013.01); *C08J 2375/04* (2013.01); *C08J 2475/04* (2013.01)

AIR-PERMEABLE SPONGE COMPOSITION AND METHOD FOR PREPARING AIR-PERMEABLE SPONGE BY USING THE SAME

FIELD OF INVENTION

The present invention relates to the field of articles for daily use, in particular to an air-permeable sponge composition and a method for preparing an air-permeable sponge by using the same.

BACKGROUND OF THE INVENTION

Generally, a sponge is a perforated foam material, which has a soft, flexible texture and is used widely in daily life. For example, articles such as mattresses, pillows, insoles, sofas or the like utilize the sponge material to increase comfortability for a human body.

However, the sponge will absorb a portion of heat from a human body after the human body and the sponge have been contacted with each other for a long time and then its temperature will rise, especially in hot and humid weather, a person will feel uncomfortably hot after he/she contacts a product made from the sponge material for a long time. A commonly employed solution is to coat a coating on a sponge body to increase ice-cold tactility. A patent document with application No. CN201210333688.6 provides a sponge and a method for making the same, wherein the prepared sponge is consisting of a sponge body, an insulation layer disposed on the surface of the sponge body, a gel layer adhered to the insulation layer and a protection layer disposed on the surface of the gel layer, the insulation layer is a PU layer, a PE layer, a PP layer or a glue coating, the protection layer is one of a thin film layer, a polyurethane coating, a PVE layer, a EVA layer, a TPU layer or a cloth layer. Although the sponge has certain ice-cold tactility when used, there is still a fuggy and hot feeling after the sponge is used for a long time because the insulation layer, the gel layer and the protection layer provided on the sponge body surface do not include a porous structure so as to degrade air permeability of the sponge, thereby compromising use effect of the sponge.

SUMMARY OF THE INVENTION

In view of the above-described problems in prior art, the present invention provides an air-permeable sponge composition and a method for preparing an air-permeable sponge by using the same, the prepared sponge simultaneously has a good air permeability while it has ice-cold tactility.

To that end, the present invention provides the following technical solution: an air-permeable sponge composition, wherein the air-permeable sponge composition comprises a sponge body and an air-permeable coating, the outer surface layer of the sponge body is coated with the air-permeable coating; wherein components of the sponge body are, based on parts by weight, as follows:

| | |
|---|---|
| isocyanate | 10-50 |
| a phase change material | 0-40 |
| polyether polyol | 20-100 |
| polymeric polyol | 10-100 |
| water | 0.5-5 |
| an amine-based catalyst | 0.1-1 |
| a tin-based catalyst | 0.09-1 |
| a silicone oil | 0.3-3 |
| cell-opener | 0.01-5 |
| a flame retardant | 0.01-15 |
| a cross-linking agent | 0.01-3 | components of the air-permeable coating are, based on parts by weight, as follows:

| | |
|---|---|
| isocyanate | 30-60 |
| a phase change material | 10-40 |
| polyether polyol | 30-90 |
| polymeric polyol | 10-80 |
| water | 0.01-1 |
| an amine-based catalyst | 0.3-0.4 |
| a tin-based catalyst | 0.2-0.25 |
| a silicone oil | 1-3 | the phase change material comprises paraffin, non-paraffin wax, crystalline hydrated salt or eutectic salt; the sponge body and air-permeable coating have the same contents of isocyanate, polyether polyol and polymeric polyol; the outer surface layer of the sponge body is coated with the air-permeable coating, the density of the sponge body is 10-60 kg/m$^3$; the density of the air-permeable coating is 30-100 kg/m$^3$.

As a preferred embodiment, contents of components of the sponge body are, based on parts by weight, as follows:

| | |
|---|---|
| isocyanate | 32-50 |
| a phase change material | 0-25 |
| polyether polyol | 20-85 |
| polymeric polyol | 15-80 |
| water | 0.5-5 |
| an amine-based catalyst | 0.1-1 |
| a tin-based catalyst | 0.09-1 |
| a silicone oil | 0.3-3 |
| cell-opener | 0.1-5 |
| a flame retardant | 0.1-10 |
| a cross-linking agent | 0.05-1 | components of the air-permeable coating are, based on parts by weight, as follows:

| | |
|---|---|
| isocyanate | 30-60 |
| a phase change material | 15-30 |
| polyether polyol | 30-90 |
| polymeric polyol | 10-80 |
| water | 1 |
| an amine-based catalyst | 0.3-0.4 |
| a tin-based catalyst | 0.2-0.25 |
| a silicone oil | 1. |

Among components of the sponge body, isocyanate, polyether polyol and polymeric polyol are main components of the air-permeable sponge. Reaction products obtained from reactions among isocyanate, polyether polyol and polymeric polyol form a main framework of a sponge porous structure. The phase change material is evenly distributed in the framework during the reactions to achieve a homogeneity. The phase change material is an energy storage material whose physical properties change with temperature so as to release or absorb latent heat. When the phase change material undergoes a phase change, latent heat of phase change is released or absorbed, and an ice-cold tactility object is achieved by utilizing a phase change material to absorb heat from a human body; in the present invention, by selecting the same or similar contents of isocyanate, polyether polyol and polymeric polyol of the sponge body and air-permeable coating, the prepared air-permeable coating and sponge body have similar component contents and porous structures, so that the bond strength between the air-permeable coating and the sponge body is larger and the coating is not easy to fall off, thereby increasing a service life of the air-permeable sponge.

Another object of the present invention is to prepare an air-permeable sponge article with a large bond strength and an excellent adhesion by a sponge body and a air-permeable coating which have different or similar densities.

Preferably, a thickness of the air-permeable coating is 0.1 to 0.3 mm.

Preferably, a thickness of the air-permeable coating is 0.2 mm.

An outer surface layer of the sponge body is coated with the air-permeable coating. The coating is used as a protection layer of the sponge body and as an ice-cold tactility layer which provides the sponge body with ice-cold tactility, and the coating also has an air permeability because of its own porous structure.

Preferably, the crystalline hydrated salt comprises one or more of sodium sulfate decahydrate, magnesium chloride hexahydrate, calcium chloride hexahydrate, sodium acetate trihydrate or disodium phosphate dodecahydrate; the eutectic salt comprises one or more of polyoxyethylene ether, polyoxyethylene, polyoxypropylene-ethylene oxide copolyether, lithium sulphate, pentaerythritol, neopentyl glycol or dihydroxymethylpropanediol.

An advantage of the crystalline hydrated salt being used as the phase change material is that the salt has a high fusion heat, a high thermal conductivity and a small volume change during phase change. An advantage of the eutectic salt being used as the phase change material is that the eutectic salt has a high fusion heat, a high thermal conductivity and a small volume change during phase change.

Preferably, the isocyanate comprises one or more of TDI, MDI, PAPI, HDI or IPDI and a NCO % content of the used isocyanate is 3-50%.

Preferably, the polyether polyol comprises one or more of polyether polyols having a hydroxy value of 20-350 mgKOH/g; the polymeric polyol comprises one or more of polymeric polyols having a hydroxy value of 10-50 mgKOH/g. The polyether polyol specifically comprises one or more of polyether polyols having designations of 3010, 1070, 330N, 307, 1030 or 3602; the polymeric polyol specifically comprises one or more of polymeric polyols having designations of 2045, H45, H30, POP50 or POP100; the addition of the polymeric polyol may be used to increase hardness of the sponge body and the air-permeable coating.

Isocyanate, polyether polyol and polymeric polyol being used as main sponge components, the reaction products obtained from the reactions therebetween form a main framework of a sponge porous structure, and a phase change material is evenly distributed in the framework during the reactions to achieve a homogeneity.

Preferably, the amine-based catalyst comprises one or more amine-based or tertiary amine-based catalysts of triethylenediamine and (dimethylaminoethyl) ether; the tin-based catalyst comprises one or more tin-based catalysts of stannous octoate or dibutyltin dilaurate. The amine-based catalyst specifically comprises one or more amine-based or tertiary amine-based catalysts having designations of A-33, A-1, UC-9729, UC-280 or NA-720. The tin-based catalyst specifically comprises one or more tin-based catalysts having designations of T9 or T12. The amine-based catalyst aims to increase a reaction rate during foaming in a preparing process. The tin-based catalyst aims to increase a reaction rate of various components.

Preferably, the silicone oil comprises a silicone oil consisting essentially of polyether-modified organosiloxane; the flame retardant comprises one or more of melamine tricresyl phosphate, triphenyl phosphite, dimethylmethylphosphonate, a composite phosphor-based flame retardant or a halogenated bisphosphonate compound reactive flame retardant; the cell-opener comprises one or more of liquid paraffin, polybutadiene, dimethylpolysiloxane, a paraffin dispersion, polyoxyethylene or polyoxyalkylene-polysiloxane copolymer; and the crosslinking agent comprises one or more of glycerol, diethanolamine or triethanolamine. The silicone oil specifically comprises an organosilicone oil having a designation of UF-5880 or UF-6588. The silicone oil aims to improve foam porosity and stabilize foam. The flame retardant aims to improve a flame retardant property of the sponge body. The cell opener aims to increase an open cell content of the sponge body and increase the air permeability of the sponge body. The cross-linking agent aims to increase an cross-link effect between composition components so as to prevent sponge body cracking.

Still another object of the present invention is to provide a method for preparing an air-permeable sponge by the above-described air-permeable sponge composition, which comprises the steps of:

step 1), placing components of the sponge body into a reaction kettle according to the above-described parts by weight, mixing, stirring, foaming and curing; wherein a stirring speed is 3000-5000 r/min and a temperature is 18-25° C., a pressure is 0.1-0.3 MPa; an injected gas flow rate is 0.1-3 L/min, a foaming speed is 2-5 m/min, a foaming height is 30-110 cm; a curing temperature is 20-30° C., and a curing time is 50-80 h;

step 2), performing a stripping process on the cured sponge to obtain a first sponge body, which then is cut and processed as needed;

step 3), mixing and stirring uniformly components of the air-permeable coating according to the above-described parts by weight using a high-speed shear stirring process to obtain a first mixture, wherein a stirring speed is 1000 to 4000 r/min;

step 4), coating the first mixture obtained in step 3 on the first sponge body obtained in step 2 in 1-3 times and controlling a coating thickness to 0.03-0.3 mm; and drying the coating being dried at a temperature of 30-90° C. for 1-10 min and then placing at room temperature to sequentially cure for 5-7 h, thereby obtaining an air-permeable sponge.

Preferably, in step 1), the stirring speed is 4000 r/min and the temperature is 20° C., the pressure is 0.2 MPa; the injected gas flow rate is 2 L/min, the foaming speed is 4 m/min, the foaming height is 100 cm; the curing temperature is 25° C. and the curing time is 72 h.

Preferably, in step 3), the stirring speed is 2000 r/min.

Preferably, the drying is carried out in a drying tunnel having a length of 10-15 m and a streamline advance speed of 2 to 4 m/min.

Preferably, the coating thickness in Step 4) is 0.2 mm; the drying tunnel in step 4) has a length of 10 m, a temperature of 60° C. and the streamline advance speed is 2 m/min; and the curing time is 5 h.

The above-described paraffin is mainly obtained by mixing straight chain alkanes, the paraffin has a molecular formula of $C_nH_{2n+2}$ ($20 \leq n \leq 40$), a phase change latent heat of 140~280 J/g, a phase change temperature of 20~60° C.

Advantages of paraffin wax being used as the phase change material are no supercooling solidification, low vapor pressure during melting without precipitation and phase separation, stable chemical property, non-toxicity and noncorrosivity, and paraffin wax is easy to obtain and cheap because it is a by-product of oil refining. The above-described non-paraffin wax comprises an aliphatic hydrocarbon product, a fatty acid product, an alcohol product and a polyolefinic alcohol product; it does not form a flowing liquid state during phase change. Water is used as a foaming agent.

The air-permeable sponge prepared in the invention can be used to make articles for daily use (such as pillows, mattresses, car cushions, etc.) and sports equipment (such as yoga mats, accessories for racquet, etc.), and can also be used to make apparel accessories (such as insoles, bra, etc).

The present invention has following advantageous effects. The phase change material is used in the air-permeable sponge prepared in the invention and utilized to absorb heat from a human body when the material undergoes a phase change so that an ice-cold tactility is obtained; secondly, the air-permeable coating of the air-permeable sponge also includes a porous structure so that an air permeability is ensured; furthermore, the air-permeable coating and sponge body have the same or similar contents of isocyanate, polyether polyol and polymeric polyol so as to have similar pore structures, and thus the bond strength between the air-permeable coating and the sponge body is large and the coating is not easy to fall off, thereby increasing a service life of the air-permeable sponge; lastly, the process steps for preparing the air-permeable sponge are reasonable, thereby mass production of qualified air-permeable sponge can be easily realized.

DETAILED DESCRIPTION OF THE INVENTION

Figure 1:
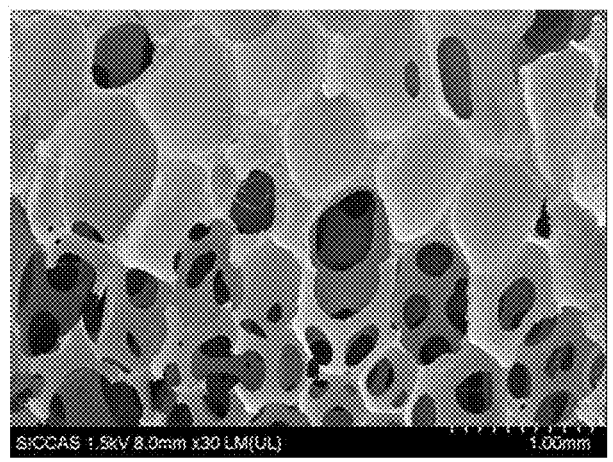
FIG. 1 is a longitudinal microstructure graph of the air-permeable sponge prepared in Example 1 of the present invention.

The technical solutions in examples of the present invention will now be explained and illustrated in combination with the accompanying drawings of the invention, but the following examples are merely preferred examples of the present invention and not exhaustive. Based on the examples in the detailed description, other examples obtained by those skilled in the art with no inventive work are within the scope of the present invention.

In order to avoid misunderstanding, each abbreviation is now explained.

TDI: i.e. toluene diisocyanate comprising two isomers of 2,4-TDI and 2,6-TDI, wherein 2,4-TDI accounts for 80%, available from Bayer (Shanghai);

MDI: i.e. diphenylmethane diisocyanate which has three isomers of 4, 4-MDI, 2,4-MDI and 2,2-MDI, available from Bayer, Germany;

PAPI: i.e. isophorondiisocyanate, available from Bayer, Germany;

IPDI: i.e. a mixture of isocyanate containing a certain amount of higher functionality and diphenylmethane diisocyanates, available from Bayer, Germany;

HDI: i.e. hexamethylene diisocyanate, available from Bayer, Germany.

3010: polyether polyol having a designation of 3010 and a hydroxy value of 56 mgKOH/g, available from Dow Chemistry;

1070: polyether polyol having a designation of 1070, available from Jiangsu Zhongshan Chemical Co., Ltd.;

330N: polyether polyol having a designation of 330N and a hydroxy value of 33 mgKOH/g, available from Jiangsu Changhua Polyurethane Technology Co., Ltd.;

307: polyether polyol having a designation of 307 and a hydroxy value of 240 mgKOH/g, available from Jiangsu Changhua Polyurethane Technology Co., Ltd.;

1030: polyether polyol having a designation of 1030 and a hydroxy value of 304 mgKOH/g;

3602: polyether polyol having a designation of 3602 and a hydroxy value of 30-34 mgKOH/g;

2045: polymeric polyol having a designation of 2045 and a hydroxy value of 30 mgKOH/g; available from Shanghai Gaoqiao Petrochemical Co., Ltd.;

H45: polymeric polyol having a designation of H45 and a hydroxy value of 19-23 mgKOH/g, available from Jiangsu Changhua Polyurethane Technology Co., Ltd.;

H30: polymeric polyol having a designation of H30 and a hydroxy value of 22-27 mgKOH/g, available from Jiangsu Changhua Polyurethane Technology Co., Ltd.;

POP100: polymeric polyol having a designation of POP100 polymer polyol, available from Shandong Bluestar Dongda Chemical Co. Ltd;

POP50: polymeric polyol having a designation of POP50 polymer polyol, available from Shandong Bluestar Dongda Chemical Co. Ltd.

A-33: an amine-based catalyst having a designation of A-33, which is a 33% triethylene diamine solution, available from Jiangsu OSiC Materials Technology Co., Ltd.;

A-1: a tertiary amine-based catalyst having a designation of A-1, which is a 70% bis (dimethylaminoethyl) ether solution, available from Jiangsu OSiC Materials Technology Co., Ltd.;

UC-9727: a tertiary amine-based catalyst having a designation of UC-9727, available from Jiangsu OSiC Materials Technology Co., Ltd.;

UC-280: an amine-based catalyst having a designation of UC-280, available from Jiangsu OSiC Materials Technology Co., Ltd.;

NA-720: an amine-based catalyst having a designation of NA-720, available from Jiangsu OSiC Materials Technology Co., Ltd.

T9: a catalyst having a designation of T9, which has a component of stannous octoate, available from Momentive, U.S.;

T12: a catalyst having a designation of T12, which has a component of dibutyltin dilaurate, available from Momentive, U.S.

UF-5880: an organosilicon oil having a designation of UF-5880, available from Jiangsu OSiC Materials Technology Co., Ltd.;

UF-6588: an organosilicon oil having a designation of UF-6588, available from Jiangsu OSiC Materials Technology Co., Ltd.

Example 1

Example 1 provides an air-permeable sponge composition, wherein an air-permeable sponge comprises a sponge body and an air-permeable coating, the outer surface layer of the sponge body is coated with the air-permeable coating; components of the sponge body are, based on parts by weight, as follows:

| isocyanate | 50 |
|---|---|
| a phase change material | 0 |
| polyether polyol | 70 |
| polymeric polyol | 30 |
| water | 3 |
| an amine-based catalyst | 0.4 |
| a tin-based catalyst | 0.2 |
| a silicone oil | 1 |
| cell-opener | 3 |
| a flame retardant | 7 |
| a cross-linking agent | 1 | components of the air-permeable coating are, based on parts by weight, as follows:

| isocyanate | 30 |
|---|---|
| a phase change material | 25 |
| polyether polyol | 70 |
| polymeric polyol | 30 |
| water | 1 |
| an amine-based catalyst | 0.4 |
| a tin-based catalyst | 0.2 |
| a silicone oil | 1. |

The isocyanate is TDI; the phase change material is polyoxypropylene-ethylene oxide copolyether; the polyether polyol is the polyether polyol having a designation of 3010; the polymeric polyol is the polymeric polyol having a designation of 2045; the amine-based catalyst is A-33, the tin-based catalyst is T9, the silicone oil is UF-5880, the flame retardant is melamine tricresyl phosphate, the cell-opener is liquid paraffin and the cross-linking agent is glycerol.

The method for preparing an air-permeable sponge by employing the above-described air-permeable sponge composition comprises the following steps.

Step 1), components of the sponge body were placed in a reaction kettle according to the above-described parts by weight, mixed, stirred, foamed and cured; wherein a stirring speed was 4000 r/min, a temperature was 20° C., a pressure was 0.2 MPa; an injected gas flow rate was 2 L/min, a foaming speed was 4 m/min, a foaming height was 100 cm; a curing temperature was 25° C., and a curing time was 72 h.

Step 2), the cured sponge was subjected to a stripping process to obtain a first sponge body, which then was cut and processed as needed;

Step 3), components of the air-permeable coating were mixed according to the above-described parts by weight and stirred uniformly using a high-speed shear stirring process to obtain a first mixture, wherein a stirring speed was 2000 r/min.

Step 4), the first mixture obtained in step 3 was coated on the first sponge body obtained in step 2 in 3 times, a thickness of the obtained coating was controlled to 0.2 mm; the coating was dried at a temperature of 60° C. for 5 min, wherein a drying tunnel had a length of 10 m and a streamline advance speed of 2 m/min; the coating then was placed at room temperature to sequentially cure for 5 h, thereby obtaining an air-permeable sponge.

Example 2

Example 2 provides an air-permeable sponge composition, wherein an air-permeable sponge comprises a sponge body and an air-permeable coating, the outer surface layer of the sponge body is coated with the air-permeable coating; components of the sponge body are, based on parts by weight, as follows:

| isocyanate | 42 |
|---|---|
| a phase change material | 0 |
| polyether polyol | 85 |
| polymeric polyol | 15 |
| water | 2.5 |
| an amine-based catalyst | 0.2 |
| a tin-based catalyst | 0.18 |
| a silicone oil | 0.8 |
| cell-opener | 2.5 |
| a flame retardant | 6 |
| a cross-linking agent | 0.8 | components of the air-permeable coating are, based on parts by weight, as follows:

| isocyanate | 60 |
|---|---|
| a phase change material | 25 |
| polyether polyol | 30 |
| polymeric polyol | 70 |
| water | 1 |
| an amine-based catalyst | 0.4 |
| a tin-based catalyst | 0.2 |
| a silicone oil | 1. |

The isocyanate is MDI; the phase change material is pentaerythritol; the polyether polyol is the polyether polyol having a designation of 330N; the polymeric polyol is the polymeric polyol having a designation of H45; the amine-based catalyst is UC-9729, the tin-based catalyst is T9, the silicone oil is UF-6588, the flame retardant is triphenyl phosphite, the cell-opener is polybutadiene and the cross-linking agent is diolamine.

The method for preparing an air-permeable sponge by employing the above-described air-permeable sponge composition has the same process parameters and steps as Example 1.

Example 3

Example 3 provides an air-permeable sponge composition, wherein an air-permeable sponge comprises a sponge body and an air-permeable coating, the outer surface layer of the sponge body is coated with the air-permeable coating; components of the sponge body are, based on parts by weight, as follows:

| isocyanate | 36 |
|---|---|
| a phase change material | 25 |

-continued

| | |
|---|---|
| polyether polyol | 40 |
| polymeric polyol | 60 |
| water | 1.7 |
| an amine-based catalyst | 0.25 |
| a tin-based catalyst | 0.1 |
| a silicone oil | 1.2 |
| cell-opener | 3 |
| a flame retardant | 5 |
| a cross-linking agent | 0.05 | components of the air-permeable coating are, based on parts by weight, as follows:

| | |
|---|---|
| isocyanate | 40 |
| a phase change material | 30 |
| polyether polyol | 50 |
| polymeric polyol | 50 |
| water | 1 |
| an amine-based catalyst | 0.4 |
| a tin-based catalyst | 0.2 |
| a silicone oil | 1. |

The isocyanate is IPDI; the phase change material is dihydroxymethylpropanediol; the polyether polyol is the polyether polyol having a designation of 3010; the polymeric polyol is the polymeric polyol having a designation of POP50; the amine-based catalyst is UC-280, the tin-based catalyst is T9, the silicone oil is UF-6588, the flame retardant is dimethylmethylphosphonate, the cell-opener is dimethylpolysiloxane and the cross-linking agent is triethanolamine.

The method for preparing an air-permeable sponge by employing the above-described air-permeable sponge composition has the same process parameters and steps as Example 1.

Example 4

Example 4 provides an air-permeable sponge composition, wherein an air-permeable sponge comprises a sponge body and an air-permeable coating, the outer surface layer of the sponge body is coated with the air-permeable coating; components of the sponge body are, based on parts by weight, as follows:

| | |
|---|---|
| isocyanate | 38 |
| a phase change material | 25 |
| polyether polyol | 40 |
| polymeric polyol | 60 |
| water | 2.3 |
| an amine-based catalyst | 0.3 |
| a tin-based catalyst | 0.09 |
| a silicone oil | 1.4 |
| cell-opener | 2.5 |
| a flame retardant | 7 |
| a cross-linking agent | 0.05 | components of the air-permeable coating are, based on parts by weight, as follows:

| | |
|---|---|
| isocyanate | 40 |
| a phase change material | 20 |
| polyether polyol | 90 |
| polymeric polyol | 10 |
| water | 1 |
| an amine-based catalyst | 0.4 |
| a tin-based catalyst | 0.2 |
| a silicone oil | 1. |

The isocyanate is TDI; the phase change material is neopentyl glycol; the polyether polyol is the polyether polyol having a designation of 3010; the polymeric polyol is the polymeric polyol having a designation of 2045; the amine-based catalyst is NA-720, the tin-based catalyst is T12, the silicone oil is UF-5880, the flame retardant is a composite phosphor-based flame retardant, the cell-opener is a paraffin dispersion and the cross-linking agent is triethanolamine.

The method for preparing an air-permeable sponge by employing the above-described air-permeable sponge composition has the same process parameters and steps as Example 1.

Example 5

Example 5 provides an air-permeable sponge composition, wherein an air-permeable sponge comprises a sponge body and an air-permeable coating, the outer surface layer of the sponge body is coated with the air-permeable coating; components of the sponge body are, based on parts by weight, as follows:

| | |
|---|---|
| isocyanate | 32 |
| a phase change material | 25 |
| polyether polyol | 40 |
| polymeric polyol | 60 |
| water | 1.5 |
| an amine-based catalyst | 0.3 |
| a tin-based catalyst | 0.1 |
| a silicone oil | 0.8 |
| cell-opener | 2 |
| a flame retardant | 5 |
| a cross-linking agent | 0.05 | components of the air-permeable coating are, based on parts by weight, as follows:

| | |
|---|---|
| isocyanate | 45 |
| a phase change material | 25 |
| polyether polyol | 20 |
| polymeric polyol | 80 |
| water | 1 |
| an amine-based catalyst | 0.3 |
| a tin-based catalyst | 0.25 |
| a silicone oil | 1. |

The isocyanate is TDI; the phase change material is sodium acetate trihydrate; the polyether polyol is the polyether polyol having a designation of 3010; the polymeric polyol is the polymeric polyol having a designation of H30; the amine-based catalyst is NA-720, the tin-based catalyst is T9, the silicone oil is UF-6588, the flame retardant is halogenated bisphosphonate, the cell-opener is polyoxyethylene and the cross-linking agent is diolamine.

The method for preparing an air-permeable sponge by employing the above-described air-permeable sponge composition has the same process parameters and steps as Example 1.

Example 6

Example 6 provides an air-permeable sponge composition, wherein an air-permeable sponge comprises a sponge body and an air-permeable coating, the outer surface layer of the sponge body is coated with the air-permeable coating; components of the sponge body are, based on parts by weight, as follows:

| | |
|---|---|
| isocyanate | 48 |
| a phase change material | 25 |
| polyether polyol | 20 |
| polymeric polyol | 80 |
| water | 3 |
| an amine-based catalyst | 0.25 |
| a tin-based catalyst | 0.12 |
| a silicone oil | 1.3 |
| cell-opener | 2 |
| a flame retardant | 7 |
| a cross-linking agent | 0.5 | components of the air-permeable coating are, based on parts by weight, as follows:

| | |
|---|---|
| isocyanate | 40 |
| a phase change material | 15 |
| polyether polyol | 70 |
| polymeric polyol | 30 |
| water | 1 |
| an amine-based catalyst | 0.4 |
| a tin-based catalyst | 0.2 |
| a silicone oil | 1. |

The isocyanate is MDI; the phase change material is sodium sulfate decahydrate; the polyether polyol employed in the sponge body has a designation of 3010; the polyether polyols employed in the air-permeable coating are the polyether polyols having designations of 3010 and 3602, wherein 3010 is in 20 parts by weight and 3602 is in 50 parts by weight; the polymeric polyol is the polyether polyol having a designation of 2045; the amine-based catalyst is NA-720, the tin-based catalyst is T9, the silicone oil is UF-5880, the flame retardant is triphenyl phosphite, the cell-opener is polyoxyalkylene-polysiloxane copolymer and the cross-linking agent is diolamine.

The method for preparing an air-permeable sponge by employing the above-described air-permeable sponge composition has the same process parameters and steps as Example 1.

Example 7

Example 7 provides an air-permeable sponge composition, wherein an air-permeable sponge comprises a sponge body and an air-permeable coating, the outer surface layer of the sponge body is coated with the air-permeable coating; components of the sponge body are, based on parts by weight, as follows:

| | |
|---|---|
| isocyanate | 45 |
| a phase change material | 25 |
| polyether polyol | 20 |
| polymeric polyol | 80 |
| water | 2.3 |
| an amine-based catalyst | 0.3 |
| a tin-based catalyst | 0.1 |
| a silicone oil | 1.2 |
| cell-opener | 2 |
| a flame retardant | 7 |
| a cross-linking agent | 0.5 | components of the air-permeable coating are, based on parts by weight, as follows:

| | |
|---|---|
| isocyanate | 60 |
| a phase change material | 25 |
| polyether polyol | 70 |
| polymeric polyol | 30 |
| water | 1 |
| an amine-based catalyst | 0.4 |
| a tin-based catalyst | 0.2 |
| a silicone oil | 1. |

The isocyanate is MDI; the phase change material is sodium sulfate decahydrate; the polyether polyol employed in the sponge body has a designation of 1070; the polyether polyols employed in the air-permeable coating are the polyether polyols having designations of 1070 and 3602, wherein 1070 is in 20 parts by weight and 3602 is in 50 parts by weight; the polymeric polyol is the polyether polyol having a designation of H45; the amine-based catalyst is NA-720, the tin-based catalyst is T9, the silicone oil is UF-5880, the flame retardant is dimethylmethylphosphonate, the cell-opener is polybutadiene and the cross-linking agent is diolamine.

The method for preparing an air-permeable sponge by employing the above-described air-permeable sponge composition has the same process parameters and steps as Example 1.

Example 8

Example 8 provides an air-permeable sponge composition, wherein an air-permeable sponge comprises a sponge body and an air-permeable coating, the outer surface layer of the sponge body is coated with the air-permeable coating; components of the sponge body are, based on parts by weight, as follows:

| | |
|---|---|
| isocyanate | 48 |
| a phase change material | 25 |
| polyether polyol | 20 |
| polymeric polyol | 80 |
| water | 1.8 |
| an amine-based catalyst | 0.2 |
| a tin-based catalyst | 0.1 |
| a silicone oil | 1 |
| cell-opener | 2.5 |
| a flame retardant | 5 |
| a cross-linking agent | 0.5 | components of the air-permeable coating are, based on parts by weight, as follows:

| | |
|---|---|
| isocyanate | 45 |
| a phase change material | 25 |
| polyether polyol | 40 |
| polymeric polyol | 60 |
| water | 1 |
| an amine-based catalyst | 0.4 |
| a tin-based catalyst | 0.2 |
| a silicone oil | 1. |

The isocyanate is HDI; the phase change material is disodium phosphate dodecahydrate; the polyether polyol is the polyether polyol having a designation of 307; the polymeric polyol is the polymeric polyol having a designation of POP50; the amine-based catalyst is A-33, the tin-based catalyst is T9, the silicone oil is UF-6588, the flame retardant is melamine tricresyl phosphate, the cell-opener is liquid paraffin and the cross-linking agent is triethanolamine.

The method for preparing an air-permeable sponge by employing the above-described air-permeable sponge composition has the same process parameters and steps as Example 1.

The densities of the air-permeable sponge bodies and the air-permeable coatings of the air-permeable sponges prepared in Examples 1 to 8 were measured, respectively. The results are as shown in Table 1. As can be seen from the table, the densities of the sponge bodies and the air-permeable coatings are different or similar, but it can be seen from FIG. 1 that the air-permeable coating is still tightly bonded with the sponge body.

TABLE 1

| | Density of sponge body (kg/m3) | Density of the air-permeable (kg/m3) |
|---|---|---|
| Example 1 | 60 | 70 |
| Example 2 | 45 | 65 |
| Example 3 | 30 | 30 |
| Example 4 | 60 | 100 |
| Example 5 | 25 | 45 |
| Example 6 | 30 | 60 |
| Example 7 | 35 | 45 |
| Example 8 | 40 | 50 |

Figure 2:
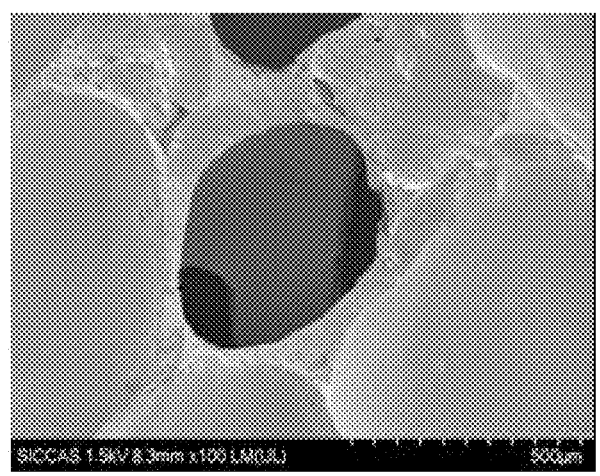
FIG. 2 is a microstructure graph of the coating of the air-permeable sponge prepared in Example 1 of the present invention.
Figure 3:
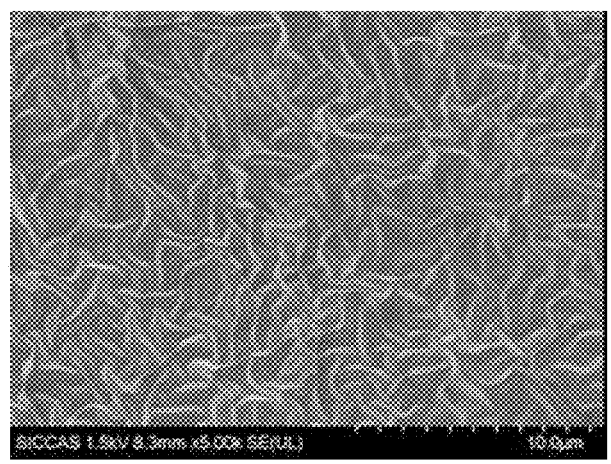
FIG. 3 is a surface topology graph magnified at 5,000× of the coating of the air-permeable sponge prepared in Example 3 of the present invention.
Figure 4:
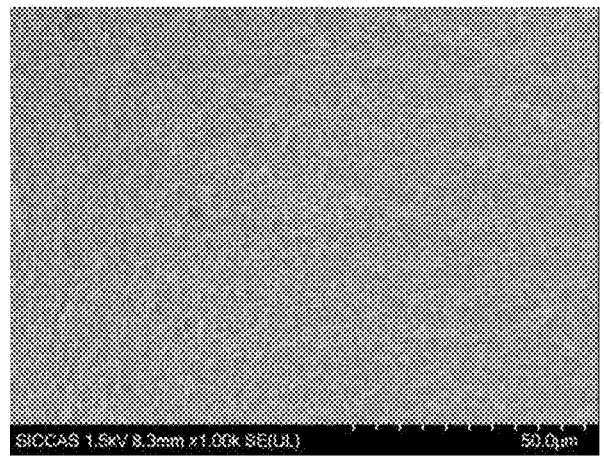
FIG. 4 is a surface topology graph magnified at 1,000× of the coating of the air-permeable sponge prepared in Example 3 of the present invention.
Figure 5:
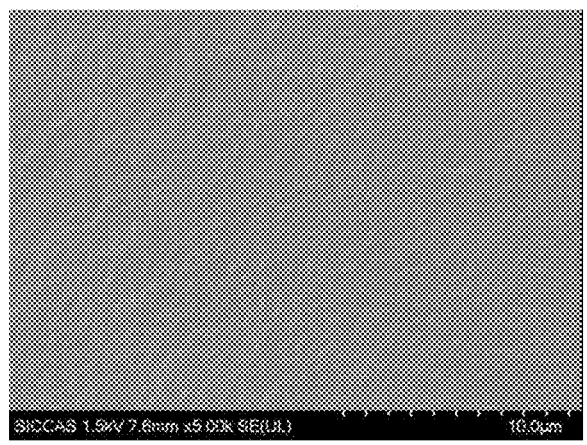
FIG. 5 is a surface topology graph magnified at 5,000× of a coating of a sponge in prior art without adding a phase change material.
Figure 6:
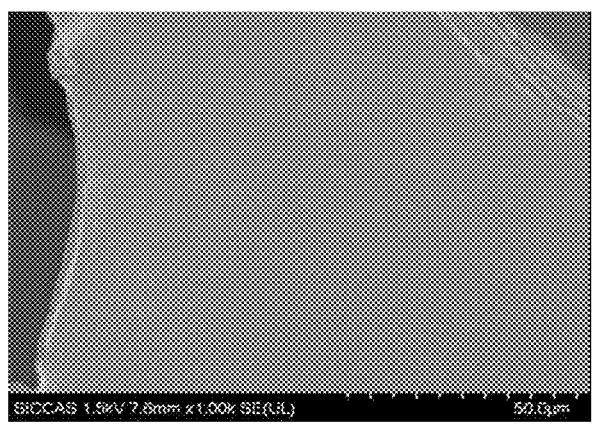
FIG. 6 is a surface topology graph magnified at 1,000× of a coating of a sponge in prior art without adding a phase change material.

In order to observe the microstructure of the air-permeable sponge, the microstructure of the air-permeable sponge was tested. In FIG. 1, the upper portion is the air-permeable coating of the air-permeable sponge, the lower portion is the sponge body of the air-permeable sponge, wherein the portion with a deeper colour is a porous structure of the sponge, as can be seen from the figure, the air-permeable coating and sponge body are bonded tightly; as can be seen from FIG. 2, the air-permeable coating has a porous structure, which demonstrates that the air-permeable coating has air permeability; FIGS. 3 and 4 are surface topology graphs of the coating of the air-permeable sponge, as can be seen from the figures, the coating incorporating a phase material has a homogeneous texture; FIGS. 5 and 6 are the surface topology graphs showing enlarged coatings of sponges in prior art without adding a phase change material. As can be seen from a comparison of FIGS. 5 and 6 and FIGS. 3 and 4, at the same magnification, the surface of the sponge without adding a phase change material tends to be smooth, when the surface contacts a human body, the surface would tightly attach to the human body and a person would feel uncomfortably hot; the air-permeable coating prepared in the present invention has a surface on which a strip-like protrusion structure is evenly distributed, when the surface is contacted with a human body, a space is left between the surface and the human body so that a uncomfortably hot feeling of the human body is reduced in comparison with the sponge in prior art.

The finished articles prepared in the above-described Examples 1 to 8 were subjected to a mechanical property test and test results were recorded in Table 2, wherein a resiliency, a hardness, a tensile strength, a compression set rate and an elongation at break of the sponge were tested.

TABLE 2

| Example | Resiliency (%) | Hardness (N/Cm$^2$) | Tensile strength (kpa) | Compression set rate (%) | Elongation at break (%) |
|---|---|---|---|---|---|
| Example 1 | 42 | 150 N | ≥70 | ≤4 | ≥80 |
| Example 2 | 45 | 130 N | ≥70 | ≤4 | ≥80 |
| Example 3 | 0 | 60 N | ≥50 | ≤4 | ≥80 |
| Example 4 | 0 | 50 N | ≥50 | ≤4 | ≥80 |
| Example 5 | 0 | 55 N | ≥50 | ≤4 | ≥80 |
| Example 6 | 0 | 40 N | ≥50 | ≤4 | ≥80 |
| Example 7 | 0 | 45 N | ≥50 | ≤4 | ≥80 |
| Example 8 | 0 | 50 N | ≥50 | ≤4 | ≥80 |

As can be seen from Table 2, except for Examples 1 and 2, the air-permeable sponge prepared in the remaining Examples are slow rebound sponges (i.e., a resiliency is zero); the lower a hardness value is, the softer a touch feel of the prepared air-permeable sponge is; the higher a tensile strength value is, the more difficult the prepared air-permeable sponge is to be broken; the lower a compression set rate value is, the better a recovery property of the prepared air-permeable sponge is; the larger an elongation at break is, the better a scalability of the prepared air-permeable sponge is. These are main measurement indexes of a sponge article.

Further, an ice-cold tactility degree of the product provided in the present invention was tested by a sensory test. Firstly, in the test, the finished articles in Examples 1-8 were made into cushions. Secondly, at room temperature of 28° C., a tester sat on the cushions to evaluate an ice-cold tactility degree of the cushions. The ice-cold tactility degrees of the sponge cushions were marked with #, and the more the "#" is, the higher the ice-cold tactility degree is. An evaluation standard is as shown in Table 3.

TABLE 3

| Count of "#" | Ice-cold tactility degree |
|---|---|
| 1 | a little heat felt during use |
| 2 | a certain degree of heat felt during use |
| 3 | no obvious ice-cold tactility |
| 4 | reasonably good ice-cold tactility where a user feels relatively comfortable |
| 5 | good ice-cold tactility where a user is given to ice-cold and comfortable tactility |

An ice-cold tactility degree felt when the user just sat on the sponge and ice-cold tactility degrees felt after 15 min and 30 min were recorded as specific test results and shown in Table 4.

TABLE 4

| Example | Initial ice-cold tactility degree | Ice-cold tactility degree after 5 min | Ice-cold tactility degree after 15 min |
|---|---|---|---|
| Without air-permeable sponge | 3 | 2 | 1 |
| Example 1 | 5 | 4 | 3 |
| Example 2 | 5 | 4 | 4 |
| Example 3 | 5 | 4 | 4 |
| Example 4 | 5 | 3 | 3 |
| Example 5 | 5 | 4 | 3 |
| Example 6 | 5 | 4 | 3 |
| Example 7 | 5 | 4 | 3 |
| Example 8 | 5 | 4 | 4 |

As can be seen from the results in Table 4, after a cushion is made from the finished articles provided by the present invention, it can provide ice-cold and comfortable tactility for a person when being just used, and even after being used for a certain time, a temperature rise and an amount of heat absorption are not significant so that a better cool feeling can be given to a person.

The foregoing is merely detailed description of the invention, and the scope of the invention is not limited thereto. It will be understood by those skilled in the art that the invention includes, but is not limited to, the content described in the drawings and the above detailed description. Any modification that does not depart from the functional and structural principles of the present invention will be included within the scope of the claims.

The invention claimed is:

1. An air-permeable sponge composition, comprising a sponge body and an air-permeable coating, wherein the outer surface layer of the sponge body is coated with the air-permeable coating; and components of the sponge body are, based on parts by weight, as follows:

| | |
|---|---|
| isocyanate | 10-50 |
| a phase change material | 0-40 |
| polyether polyol | 20-100 |
| polymeric polyol | 10-100 |
| water | 0.5-5 |
| an amine-based catalyst | 0.1-1 |
| a tin-based catalyst | 0.09-1 |
| a silicone oil | 0.3-3 |
| cell-opener | 0.01-5 |
| a flame retardant | 0.01-15 |
| a cross-linking agent | 0.01-3 | components of the air-permeable coating are, based on parts by weight, as follows:

| | |
|---|---|
| isocyanate | 30-60 |
| a phase change material | 10-40 |
| polyether polyol | 30-90 |
| polymeric polyol | 10-80 |
| water | 0.01-1 |
| an amine-based catalyst | 0.3-0.4 |
| a tin-based catalyst | 0.2-0.25 |
| a silicone oil | 1-3; | the phase change material comprises paraffin, non-paraffin wax, crystalline hydrated salt or eutectic salt; contents of the isocyanate, polyether polyol and polymeric polyol of the sponge body and those of the air-permeable coating are the same; the density of the sponge body is 10-60 kg/m³; the density of the air-permeable coating is 30-100 kg/m³.

2. The air-permeable sponge composition as claimed in claim 1, wherein contents of components of the sponge body are, base on parts by weight, as follows:

| | |
|---|---|
| isocyanate | 32-50 |
| a phase change material | 0-25 |
| polyether polyol | 20-85 |
| polymeric polyol | 15-80 |
| water | 0.5-5 |
| an amine-based catalyst | 0.1-1 |
| a tin-based catalyst | 0.09-1 |
| a silicone oil | 0.3-3 |
| cell-opener | 0.1-5 |
| a flame retardant | 0.1-10 |
| a cross-linking agent | 0.05-1 | components of the air-permeable coating are, based on parts by weight, as follows:

| | |
|---|---|
| isocyanate | 30-60 |
| a phase change material | 15-30 |
| polyether polyol | 30-90 |
| polymeric polyol | 10-80 |
| water | 1 |
| an amine-based catalyst | 0.3-0.4 |
| a tin-based catalyst | 0.2-0.25 |
| a silicone oil | 1. |

3. The air-permeable sponge composition as claimed in claim 1, wherein the air-permeable coating has a thickness of 0.1-0.3 mm.

4. The air-permeable sponge composition as claimed in claim 2, wherein the air-permeable coating has a thickness of 0.1-0.3 mm.

5. The air-permeable sponge composition as claimed in claim 1, wherein the air-permeable coating has a thickness of 0.2 mm.

6. The air-permeable sponge composition as claimed in claim 2, wherein the air-permeable coating has a thickness of 0.2 mm.

7. The air-permeable sponge composition as claimed in claim 1, wherein the crystalline hydrated salt comprises one or more of sodium sulfate decahydrate, magnesium chloride hexahydrate, calcium chloride hexahydrate, sodium acetate trihydrate or disodium phosphate dodecahydrate; the eutectic salt comprises one or more of polyoxyethylene ether, polyoxyethylene, polyoxypropylene-ethylene oxide copolyether, lithium sulphate, pentaerythritol, neopentyl glycol or dihydroxymethylpropanediol.

8. The air-permeable sponge composition as claimed in claim 2, wherein the crystalline hydrated salt comprises one or more of sodium sulfate decahydrate, magnesium chloride hexahydrate, calcium chloride hexahydrate, sodium acetate trihydrate or disodium phosphate dodecahydrate; the eutectic salt comprises one or more of polyoxyethylene ether, polyoxyethylene, polyoxypropylene-ethylene oxide copolyether, lithium sulphate, pentaerythritol, neopentyl glycol or dihydroxymethylpropanediol.

9. The air-permeable sponge composition as claimed in claim 1, wherein the isocyanate comprises one or more of TDI, MDI, PAPI, HDI or IPDI, and the NCO % content of the used isocyanate is 3-50%.

10. The air-permeable sponge composition as claimed in claim 2, wherein the isocyanate comprises one or more of TDI, MDI, PAPI, HDI or IPDI, and the NCO % content of the used isocyanate is 3-50%.

11. The air-permeable sponge composition as claimed in claim 1, wherein the polyether polyol comprises one or more of polyether polyols having a hydroxy value of 20-350 mgKOH/g; the polymeric polyol comprises one or more of polymeric polyols having a hydroxy value of 10-50 mgKOH/g.

12. The air-permeable sponge composition as claimed in claim 2, wherein the polyether polyol comprises one or more of polyether polyols having a hydroxy value of 20-350 mgKOH/g; the polymeric polyol comprises one or more of polymeric polyols having a hydroxy value of 10-50 mgKOH/g.

13. The air-permeable sponge composition as claimed in claim 1, wherein the amine-based catalyst comprises one or more amine-based or tertiary amine-based catalysts of triethylenediamine and (dimethylaminoethyl) ether, the tin-based catalyst comprises one or more tin-based catalysts of stannous octoate or dibutyltin dilaurate.

14. The air-permeable sponge composition as claimed in claim 2, wherein the amine-based catalyst comprises one or more amine-based or tertiary amine-based catalysts of triethylenediamine and (dimethylaminoethyl) ether; the tin-based catalyst comprises one or more tin-based catalysts of stannous octoate or dibutyltin dilaurate.

15. The air-permeable sponge composition as claimed in claim 1, wherein the silicone oil comprises a silicone oil of polyether-modified organosiloxane; the flame retardant comprises one or more of melamine tricresyl phosphate, triphenyl phosphite, dimethylmethylphosphonate, a composite phosphor-based flame retardant or a halogenated bisphosphonate compound reactive flame retardant; the cell-opener comprises one or more of liquid paraffin, polybutadiene, dimethylpolysiloxane, a paraffin dispersion, polyoxyethylene or polyoxyalkylene-polysiloxane copolymer; and the crosslinking agent comprises one or more of glycerol, diethanolamine or triethanolamine.

16. The air-permeable sponge composition as claimed in claim 2, wherein the silicone oil comprises a silicone oil of polyether-modified organosiloxane; the flame retardant comprises one or more of melamine tricresyl phosphate, triphenyl phosphite, dimethylmethylphosphonate, a composite phosphor-based flame retardant or a halogenated bisphosphonate compound reactive flame retardant; the cell-opener comprises one or more of liquid paraffin, polybutadiene, dimethylpolysiloxane, a paraffin dispersion, polyoxyethylene or polyoxyalkylene-polysiloxane copolymer; and the crosslinking agent comprises one or more of glycerol, diethanolamine or triethanolamine.

17. A method for preparing an air-permeable sponge by using the air-permeable sponge composition as claimed in claim 1, wherein the method comprises the steps of:
- step 1), placing components of the sponge body into a reaction kettle according to the above-described parts by weight, mixing, stirring, foaming and curing; wherein a stirring speed is 3000-5000 r/min and a temperature is 18-25° C., a pressure is 0.1-0.3 MPa; an injected gas flow rate is 0.1-3 L/min, a foaming speed is 2-5 m/min, a foaming height is 30-110 cm; a curing temperature is 20-30° C., and a curing time is 50-80 h;
- step 2), performing a stripping process on the cured sponge to obtain a first sponge body, which then is cut and processed as needed;
- step 3), mixing and stirring uniformly components of the air-permeable coating according to the above-described parts by weight using a high-speed shear stirring process to obtain a first mixture, wherein a stirring speed is 1000 to 4000 r/min;
- step 4), coating the first mixture obtained in step 3 on the first sponge body obtained in step 2 in 1-3 times and controlling a coating thickness to 0.03-0.3 mm; and drying the coating at a temperature of 30-90° C. for 1-10 min and then placing at room temperature to subsequently cure for 5-7 h, thereby obtaining an air-permeable sponge.

* * * * *